US009238253B2

(12) United States Patent
Levanduski et al.

(10) Patent No.: US 9,238,253 B2
(45) Date of Patent: Jan. 19, 2016

(54) PROCESSED DRI MATERIAL

(75) Inventors: Gary M. Levanduski, Grosse Ile, MI (US); Kyle Bartholomew, Grand Rapids, MN (US); David W. Hendrickson, Coleraine, MN (US); Christopher P. Manning, North Easton, MA (US); Anthony Ramjewan, Carapichaima (TT)

(73) Assignee: Nu-Iron Technology LLC, Charlotte, NC (US)

( * ) Notice: Subject to any disclaimer, the term of this patent is extended or adjusted under 35 U.S.C. 154(b) by 102 days.

(21) Appl. No.: 13/821,169

(22) PCT Filed: Sep. 9, 2011

(86) PCT No.: PCT/US2011/050995
§ 371 (c)(1),
(2), (4) Date: May 16, 2013

(87) PCT Pub. No.: WO2012/034015
PCT Pub. Date: Mar. 15, 2012

(65) Prior Publication Data
US 2013/0230720 A1    Sep. 5, 2013

Related U.S. Application Data

(60) Provisional application No. 61/381,907, filed on Sep. 10, 2010.

(51) Int. Cl.
B07B 1/00       (2006.01)
C21B 11/06      (2006.01)
C21B 13/08      (2006.01)

(52) U.S. Cl.
CPC . B07B 1/00 (2013.01); C21B 11/06 (2013.01); C21B 13/08 (2013.01); *Y10T 428/2982* (2015.01); *Y10T 428/2991* (2015.01)

(58) Field of Classification Search
CPC ............... B07B 1/00; Y10T 428/2982; Y10T 428/2991; C21B 11/06; C21B 13/08
USPC .................... 428/402, 403; 427/216; 451/32; 209/235
See application file for complete search history.

(56) References Cited

U.S. PATENT DOCUMENTS

| | | | |
|---|---|---|---|
| 268,180 A | 11/1882 | Butterfield | |
| 2,874,037 A | 2/1959 | Fisher | |
| 3,285,711 A | 11/1966 | Stanford | |
| 3,353,952 A * | 11/1967 | Hansen | 75/760 |
| 3,407,089 A | 10/1968 | Sampson | |
| 3,469,970 A * | 9/1969 | Gunter | 75/436 |
| 3,480,425 A | 11/1969 | Hardy | |
| 3,520,676 A | 7/1970 | Stahr | |
| 3,549,425 A | 12/1970 | Segura | |
| 3,556,838 A | 1/1971 | Segura | |
| 3,594,956 A | 7/1971 | Conover | |
| 3,615,340 A | 10/1971 | Fuqua | |
| 3,617,394 A | 11/1971 | Mayer | |
| 3,704,088 A | 11/1972 | Nagel | |
| 3,723,059 A | 3/1973 | Thumm | |
| 3,728,110 A | 4/1973 | Klar | |
| 3,765,131 A | 10/1973 | Christensen | |
| 3,861,086 A | 1/1975 | Dreher | |
| 3,978,623 A | 9/1976 | Smith | |
| 4,030,913 A | 6/1977 | Wegener | |
| 4,044,459 A | 8/1977 | Burlingame | |
| 4,069,015 A | 1/1978 | Ahrendt | |
| 4,075,370 A | 2/1978 | Burlingame | |
| 4,076,520 A | 2/1978 | Pietsch | |
| 4,093,455 A | 6/1978 | Pietsch | |
| 4,131,668 A | 12/1978 | Sasaki et al. | |
| 4,131,688 A * | 12/1978 | Grosclaude et al. | 426/40 |
| 4,187,084 A * | 2/1980 | Khomich et al. | 51/308 |
| 4,232,486 A | 11/1980 | Rampe | |
| 4,245,478 A | 1/1981 | Covy | |
| 4,254,167 A | 3/1981 | Sulzbacher | |
| 4,274,825 A * | 6/1981 | North | 432/13 |
| 4,313,757 A * | 2/1982 | Kiyonoga | 75/755 |
| 4,329,168 A | 5/1982 | Rubio | |
| 4,388,116 A | 6/1983 | Carrillo-Cantu | |
| 4,407,864 A | 10/1983 | Stift | |
| 4,692,353 A | 9/1987 | Ahmed | |
| 5,076,157 A | 12/1991 | Satake | |
| 5,091,077 A | 2/1992 | Williams | |
| 5,113,890 A * | 5/1992 | Elizondo-Gonzalez et al. | 137/13 |
| 5,547,357 A | 8/1996 | Bergendahl | |
| 5,731,272 A | 3/1998 | Tanaka | |
| 5,989,304 A | 11/1999 | Ozaki | |
| 6,048,382 A * | 4/2000 | Greenwalt | 75/436 |
| 6,182,817 B1 * | 2/2001 | Rinker et al. | 198/671 |
| 6,254,466 B1 | 7/2001 | Mucciacciaro | |
| 6,334,883 B1 | 1/2002 | Takenaka | |
| 6,342,089 B1 | 1/2002 | McGaa | |
| 2005/0092130 A1 | 5/2005 | Golberger | |
| 2009/0095129 A1* | 4/2009 | Basdag | 75/342 |

FOREIGN PATENT DOCUMENTS

WO      2004/031421 A2    4/2004

OTHER PUBLICATIONS

Hassan, A. Dedicated to Promoting Hot Briquetted Iron As the Ideal source of Merchant Steelmaking Metallics, DRI Update (May 2008), pp. 8-11, Sponge Iron Manufacturers Association.

* cited by examiner

*Primary Examiner* — Leszek Kiliman
(74) *Attorney, Agent, or Firm* — Hahn, Loeser & Parks LLP; Arland T. Stein

(57) ABSTRACT

A processed DRI material having an average surface roughness (Ra) of less than 1.5 μm is disclosed. A method and system for making processed DRI are also disclosed. One embodiment of the method and system may include assembling a rotatable chamber having an internal screen capable of supporting DRI during tumbling, with at least one opening in the chamber to permit fines to exit the chamber during tumbling, and delivering DRI into the chamber to tumble the DRI on the screen to remove fines from the DRI. Another embodiment of the method and system may include assembling a rotatable chamber having a feed end and an exit end, and having a screen therein capable of supporting DRI as the DRI moves through the chamber, and delivering DRI to the chamber and rotating the chamber to tumble the DRI while removing fines.

20 Claims, 16 Drawing Sheets

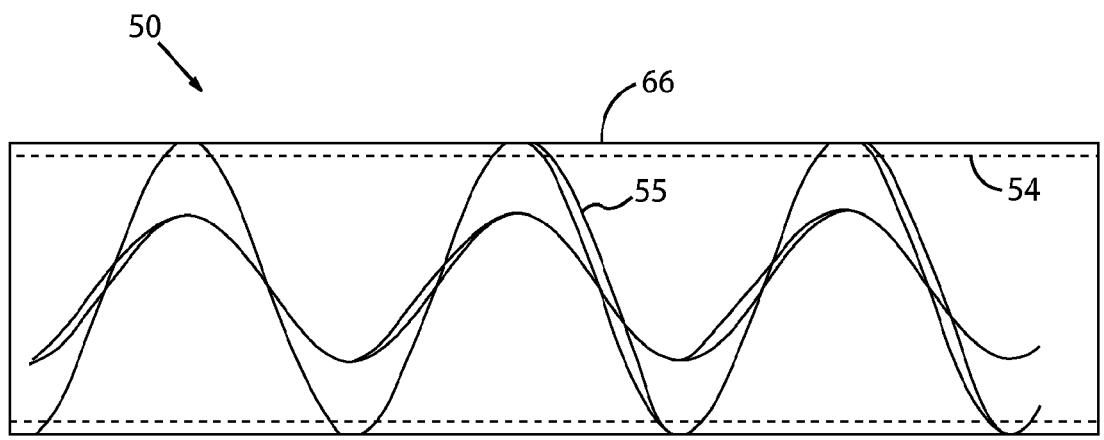
FIG. 7A
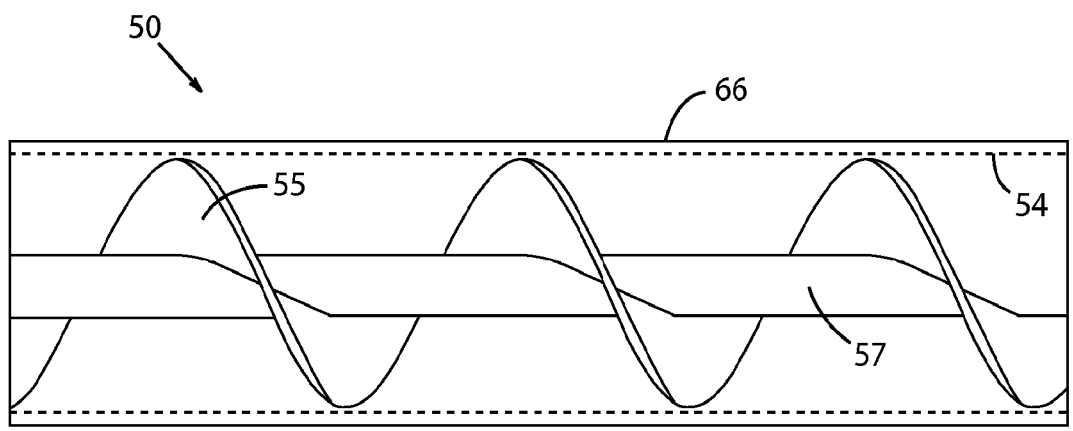

PROCESSED DRI MATERIAL

BACKGROUND AND SUMMARY OF THE DISCLOSURE

The present disclosure relates to a system and method for making direct reduced iron. Direct reduced iron (DRI), sometimes called sponge iron, is a commercial product widely used as a source material for making steel. The conventional techniques for making steel involve the use of an electric arc furnace (EAF) or a basic oxygen furnace (BOF). DRI is typically higher in iron units than taconite pellets and other sources of iron, and can be used as a partial substitute for scrap in the production of steel by EAF.

DRI is formed from beneficiated iron ore, such as taconite pellets. For example, taconite has been mined and crushed, and the iron containing portions magnetically separated from the non-iron containing portions to form a beneficiated product higher in iron content than mined taconite. The beneficiated iron ore portion may be formed into pellets by pelletizing, and heated in a linear hearth furnace in the presence of reducing agent (e.g., carbonaceous material) to a temperature below the melting point of iron using natural gas or coal, to promote the reduction of iron ore to metallic iron. DRI is typically above 90% metallic iron with the remainder gangue.

In the process to make DRI, the beneficiated and pelletized iron oxide containing material is moved through a furnace mixed with a reducing agent, such as coal, coke, or another form of carbonaceous material. A desulfurizing agent, such as limestone or dolomite, is also typically added. The carbon of the reducing agent and the oxygen of the iron oxide material react chemically in the reducing zone of the furnace, thereby partially reducing the iron oxide to form metallic iron. This, and other traditional reducing processes, are used to create the DRI.

DRI is difficult to transport because DRI and DRI fines are highly reactive with oxygen in air and moisture. Moisture, in particular, reacts with the iron forming FeO and $H_2$. The DRI being sponge iron has many voids making it porous in nature. The porous nature of DRI also means that it has low compressive strength, and handling of DRI generates surface fines. Additionally, when the DRI is stored, for example in the hold of a ship during transportation, some of the pellets have been prone to disintegrate under the weight of pellets above them further generating fines and small particles. The DRI fines and small particles increased the ability for reaction with moisture and oxygen around it. Additionally, the rough surface characteristics of the DRI pellets produce particulate matter and other fines having a high surface area, which also promoted the likelihood of the DRI reacting with oxygen. Such particulate matter and fines typically are produced throughout the storage and transportation of the DRI, making it difficult to transport DRI over long distances and to store DRI for long periods.

The porous, low internal strength, and flakey nature of DRI all increase the surface area of the nodule that is exposed to an oxidizing atmosphere and/or moisture, resulting in substantial and rapid oxidation and rusting. The reactions that occur during DRI oxidation produce heat and hydrogen making DRI susceptible to overheating and combustion. Increases in temperature in containers storing DRI, in which air is free to circulate, can reach 1200° F. Such combustion causes fires in the holds of ships during transportation of DRI and in the clam buckets of cranes when unloading DRI. These risks have substantially increased the cost of DRI delivered to a steel plant because of the losses during transportation and storage. Due to the difficulties and risks associated with transporting DRI, production of DRI has with a few exceptions been generally located near the steelmaking facilities and near the time of use in steelmaking, rather than in more economical locations and times.

Consequently, various techniques have been used in the past to passivate DRI to reduce the risks associated with its pyrophoric properties and improve its compressive strength. However, despite various attempts there still remains a need for an economic and efficient way of passivating DRI so it can be safely transported over long distances in bulk and stored. A strong, stable and pyrophobic product would enable the safe transport and storage of DRI, dramatically increasing its usefulness and effectiveness in steelmaking.

Presently disclosed are a method and system for making processed DRI. The method comprises assembling a rotatable chamber having an internal screen capable of supporting DRI during tumbling within the chamber, with at least one opening in the chamber adapted to permit fines to exit the chamber during tumbling, and delivering DRI into the rotatable chamber and rotating the chamber to tumble the DRI on the screen in the chamber to remove fines from the DRI. The screen may have a mesh size between ⅛ and ¼ mesh. The method may also include evacuating fines removed from the DRI through the opening or openings in the rotatable chamber during rotation of the chamber, and may include evacuating fines removed from the DRI during tumbling. The DRI may be tumbled in the rotatable chamber at between 20 and 50 or between 20 and 40 revolutions per minute for a residence time of at least 10 minutes in the chamber to produce the desired removal, which is manifested by the DRI having a polished appearance.

The method and system for making processed DRI may also include assembling rotatable rollers downstream of the rotatable chamber adapted to rotate the DRI and applying oil to the processed DRI. Spray nozzles may be positioned and adapted to deliver oil to the processed DRI rotating on rollers. The oil may be mineral oil, and may include oleic acid. The oil may be heated prior to delivery of the oil to the processed DRI.

The method and system for making processed DRI may further comprise applying a material adapted to increase the compressive strength of the DRI to the processed and oiled DRI. The material may include limestone, such as a limestone based binder.

A method and system for making processed DRI is also disclosed that comprises assembling a rotatable chamber having a feed end and an exit end, and having an internal screen capable of supporting DRI during tumbling as the DRI moves through the rotating chamber from the feed end to the exit end and having at last one opening along the chamber to permit fines removed from the DRI during tumbling to exit the chamber, delivering DRI to the rotatable chamber through the feed end and rotating the chamber to tumble the DRI on the screen in the chamber while the DRI moves through the chamber from the feed end to the exit end while removing fines from the DRI, and removing processed DRI from the discharge end of the rotatable chamber.

Also disclosed is a processed DRI material having a surface roughness (Ra) of less than 1.5 μm. Alternatively, the processed DRI material may have a surface roughness (Ra) of less than 1.0 μm, or less than 0.75 μm. The processed DRI material may comprise pellets, and may have a tumble index of greater than 98.5%+¼ after 200 revolutions. In other examples, the processed DRI material may be coated with oil, and the oil may comprise mineral oil and oleic acid. The processed DRI material may also comprise a binder, such as limestone, to increase the compressive strength of the DRI material.

Also disclosed is a processed DRI material having a surface roughness (Ra) of less than 1.5 μm made by the steps of assembling a rotatable chamber having a feed end and an exit end, and having an internal screen capable of supporting DRI during tumbling as the DRI moves through the rotating chamber from the feed end to the exit end and having at last one opening along the chamber to permit fines removed from the DRI during tumbling to exit the chamber, delivering DRI to the rotatable chamber through the feed end and rotating the chamber to tumble the DRI on the screen in the chamber while the DRI moves through the chamber from the feed end to the exit end while removing fines from the DRI, and removing processed DRI from the discharge end of the rotatable chamber.

BRIEF DESCRIPTION OF THE DRAWINGS

Reference is made to the accompanying drawings in which particular embodiments and further benefits of the invention are illustrated as described in more detail in the description below.

FIGS. 7A-7B are cross section views of a chamber for use with the system of FIG. 6.

DETAILED DESCRIPTION OF THE DRAWINGS

Presently disclosed is a processed DRI material having modified surfaces. The processed DRI may be made by tumbling DRI over a screen to remove fines, including dust and other particulates, fractured DRI, and other small pieces, which contribute to the pyrophoric nature of DRI. The DRI material is formed in nodules or pellets up to about ½ inch or more in size. A method and system for making DRI may comprise the steps of assembling a rotatable chamber having an internal screen capable of supporting DRI during tumbling within the chamber, with at least one opening in the chamber adapted to permit fines to exit the chamber during tumbling, and delivering DRI into the rotatable chamber and rotating the chamber to tumble the DRI on the screen in the chamber to remove fines from the DRI. Tumbling may generally be described as agitating the DRI material to cause the DRI pellets or nodules to interact each other and with the screen to abrade the surfaces of the DRI material. The tumbling of the DRI material may be achieved using a variety of techniques to agitate the DRI material, such as rolling, turning, or vibrating the DRI material as explained in more detail below.

Figure 1:
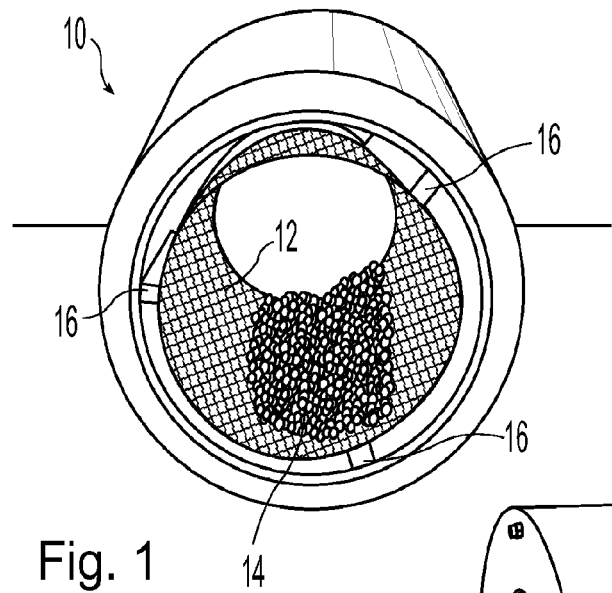
FIG. 1 is a front view of an embodiment of a system for making processed DRI.

Referring generally to FIGS. 1 through 9, batch and continuous systems for making processed DRI are illustrated. As shown in FIG. 1, DRI pellets 14 may be delivered to a rotatable chamber 10 having a screen 12 capable of supporting DRI pellets 14 during tumbling. The screen 12 is positioned within the rotatable chamber 10 and adapted to support the DRI pellets 14 while the chamber 10 is rotated. In one example, the screen 12 may be secured to the rotatable chamber 10 by screen supports 16. The screen supports 16 may provide lateral and longitudinal support to the screen to maintain the screen 12 in the desired position within the chamber 10. As illustrated, the chamber 10 may be configured for batch processing of DRI material and have an opening for inserting and removing the DRI material. An appropriate door or cover (not shown) may be used to close the chamber during operation to retain the DRI material within the chamber and inhibit the unintended egress of fines and other particulates. As described in more detail below, other chamber configurations, including chambers for substantially continuous processing of DRI material configured with both an entry and exit opening may also be employed with other embodiments of the method and system presently disclosed.

When the chamber 10 is rotated, the DRI pellets 14 are tumbled on the screen 12 within the chamber 10. As the DRI pellets 14 tumble, the DRI pellets 14 contact each other and contact the screen 12. The tumbling of the DRI pellets 14 abrades the surface of the pellets 14. The tumbling process may also cause DRI pellets having insufficient compressive strength to break or disintegrate. In this manner the tumbling process may not only abrade the surface of the DRI material but reduce the number of weak DRI pellets that may be broken during subsequent processing or transportation. As such, the generation of fines, including dust and larger particulate matter from the DRI pellets, may be concentrated in the tumbling system. The generation of fines from the DRI pellets in subsequent processes may also be reduced.

Figure 2A:
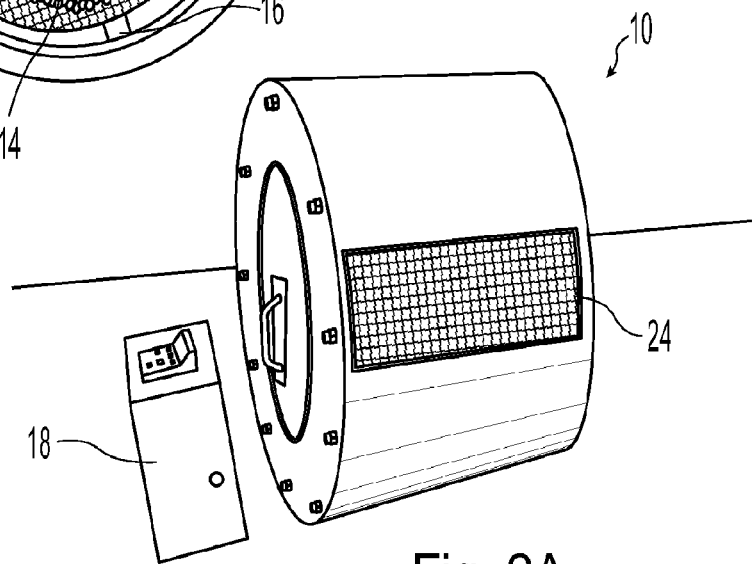
FIG. 2A is a perspective view of another embodiment of a system for making processed DRI.
Figure 2B:
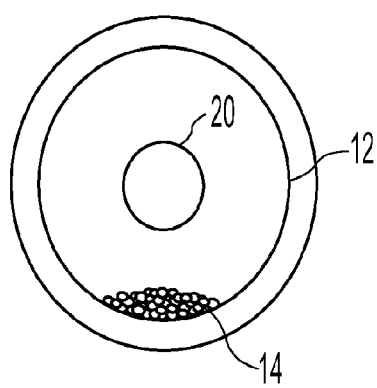
FIG. 2B is a cross sectional view of the system of FIG. 2B.

Referring to FIGS. 2A and 2B, another embodiment of the system and method for making DRI is illustrated. The rotatable chamber 10 may also have a screen 12 relieved across the inner surface of the chamber. The chamber 10 may also have an inner wall 20. As shown in FIG. 2A, the chamber 10 may have an opening 24 through which dust and particulate matter generated during tumbling of the DRI pellets 14 may be removed, while the DRI is tumbling within the chamber. For example, the screen supports 16 may create a space or gap between the chamber 10 and the screen 12. Dust and particulates produced during the tumbling process may pass through the openings of the screen 12 and move through the space or gap between the chamber 10 and the screen 12 to opening 24 in the chamber 10. As the chamber 10 rotates, the opening 24 may allow the dust and particulates to exit the chamber 10. A positive pressure or other collection system may be employed to collect the dust and particulates exiting the chamber in an adjacent plenum. The chamber 10 may be rotated by a motor (not shown) and the rotation speed may be controlled by a control system 18. The control system 18 may also control the positive pressure or other collection system and may be capable of monitoring the generation of dust and other particulates from the DRI.

Figure 3:
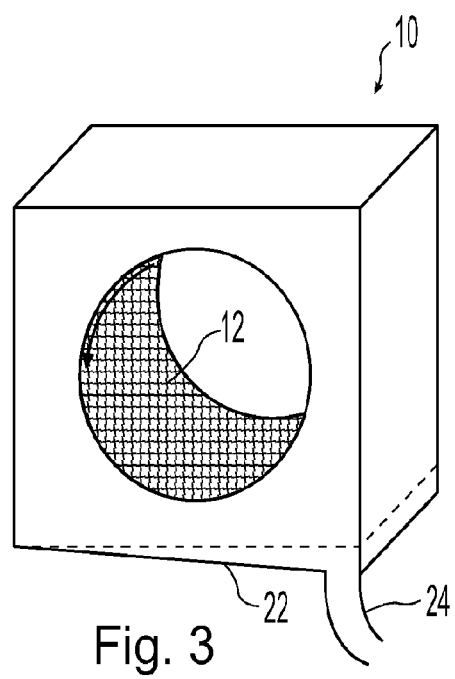
FIG. 3 is yet another embodiment of a system for making processed DRI.

Referring to FIG. 3, the chamber 10 may be positioned within a housing adapted to confine fugitive dust and particulates. The housing may include a housing floor 22 on which dust and particulates may be collected and an exit 25 configured to allow the dust and particulates to be removed from the housing during the tumbling process. In one embodiment, the housing floor 22 may be sloped to facilitate the transfer of dust and particulates to the exit 25.

Figure 4A:
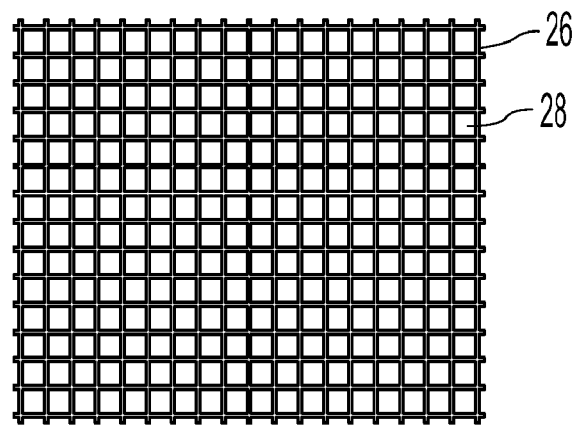
FIG. 4A a top view of a screen for use with making processed DRI.
Figure 4B:
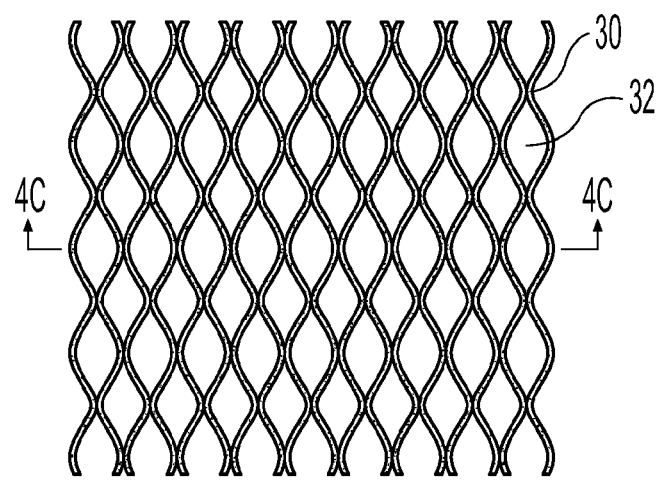
FIG. 4B is a top view of another screen for use with making processed DRI.
Figure 4C:
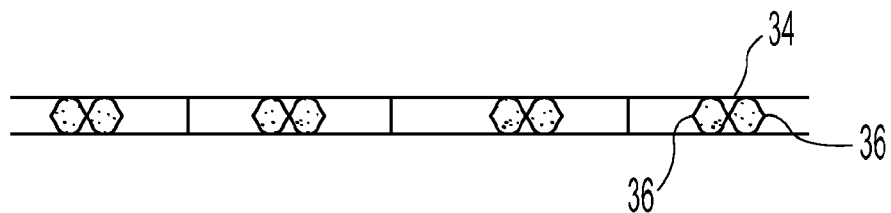
FIG. 4C is a cross sectional view of the screen of FIG. 4B.

In the embodiments of the method and system previously described, DRI pellets may be supplied to the system and supported on a screen. During operation, the system may cause the screen to rotate thereby tumbling the DRI pellets against each other and against the screen 12. The interaction of the DRI pellets and interaction with the screen abrade the surface of the DRI pellets. Referring to FIGS. 4A through 4C, screens for use with the presently disclosed method and system are illustrated. A rectangular screen 26 having substantially square openings 28 is illustrated in FIG. 4A. The screen may be ¼ mesh to retain DRI material having a diameter of 0.25 inch or greater. Other size screens, such as ⅛ mesh, may also be used. Another screen 30 is illustrated in FIG. 4B having substantially diamond shaped openings 32.

A cross section of the screen 30 is shown in FIG. 4C. As shown in cross section, the screen may have a profile formed of at least a top portion 34 and side portions 36. As the DRI pellets tumble on the screen, the pellets may strike the top portion 34 and the side portions 36 of the screen 30. The screen profile may be chosen to increase or decrease, as desired, the abrasion of the DRI pellets during tumbling to achieve the desired modification of the surface of the DRI pellet.

The length of time or duration of tumbling and the rotation speed may also be selected to achieve the desired degree of surface modification of DRI pellets, with sufficient compressive strength, to substantially improve transportability of the DRI. Experiments were conducted using different rotation speeds (RPM) and residence times (minutes). DRI pellets were tumbled on a ¼ mesh screen and the dust and particulates generated that passed through the ¼ mesh screen (collectively the fines generated) were collected and weighed. The percents by weight of the fines generated in these experiments are presented in the following table:

| RPM | Residence Time | Fines Generated |
| --- | --- | --- |
| 27 | 15 minutes | 0.9%-¼ inch |
| 27 | 30 minutes | 1.6%-¼ inch |
| 46 | 15 minutes | 2.4%-¼ inch |
| 46 | 30 minutes | 4.2%-¼ inch |

As illustrated in the preceding table, the fines generated tend to increase with both rotation speed and tumbling time. The tumbling may be continued for 15 or 20 minutes at a rotation rate of 20 to 50 rpm or 20 to 40 rpm, depending on the particular embodiment of the method. A grinding medium, such as peanut shells, may also be used, but such a medium is not necessary or desired.

Figure 5:
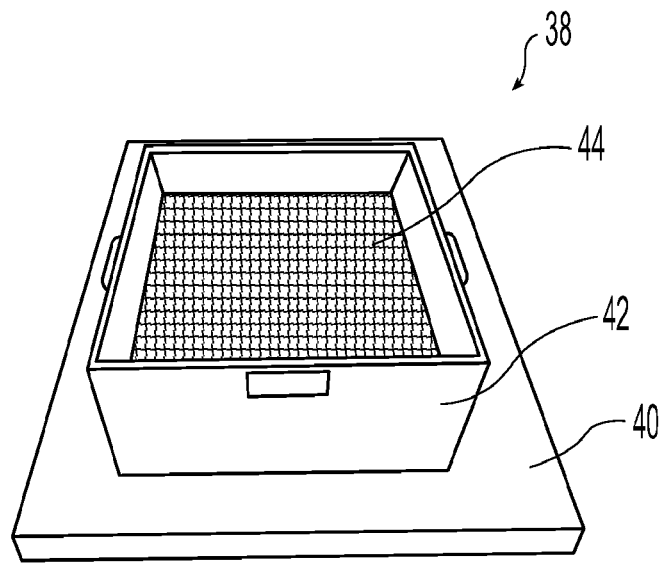
FIG. 5 is a perspective view of a Gilson screen.

Referring now to FIG. 5, a Gilson screen 38 is illustrating comprising a screen 44, such as a ¼ mesh screen, housed within a container 42 mounted to a shake table 40. DRI material may be placed onto the screen 44 and the shake table 40 operated to vibrate the DRI material causing the DRI material to tumble on the screen. As the DRI material tumbles on the screen 44, the surfaces of the DRI material may be abraded as previously discussed and weak DRI pellets may be broken down. The time required for tumbling the DRI material on the screen 44 may be selected to achieve the desired modification for the surfaces of the processed DRI. As illustrated the container 42 extends below the screen 44 to capture the fines and other particulates. In other embodiments, a container may enclose the screen 44 or a separate cover may be provided to enclose the system to confine duct and other particulate matter generated during the tumbling operation. A method of making processed DRI may comprise assembling a chamber having an internal screen capable of supporting DRI during tumbling within the chamber, with portion adapted to receive fines generated during tumbling of the DRI on the screen, and delivering DRI into the chamber and operating the chamber to tumble the DRI on the screen in the chamber to abrade the surface of the DRI.

The fines generated from processed DRI may also be measured using a Gilson screen such as that illustrated in FIG. 5. DRI material may be placed on the screen 44 and the shake table operated to sift the DRI material to separate the DRI pellets that are retained by the screen 44 from the fines that pass through the screen 44. The size of the screen 44 may be selected depending upon the size of the fines being measured. For example, a screen size of ¼ mesh may be used to measure larger fines, while a 28 mesh screen may be used to measure smaller fines.

The method and system of making DRI may include evacuating the fines removed from the DRI while the chamber is rotating. As described above, a vacuum or other collection system may be adapted to provide a positive pressure through the chamber 10 and through opening 24 to capture and evacuate the fines removed from the DRI. The fines may be collected outside the chamber and stored for subsequent processing. In one embodiment, the fines may be compacted into briquettes as described in U.S. Pat. No. 4,076,520. In another embodiment, the system may measure the amount of fines being generated during the tumbling process. As tumbling progresses, the amount of fines being generated may be expected to decrease as the surface of the DRI pellets is smoothed and the weak DRI pellets are broken. The method and system for making DRI may therefore include rotating the chamber until the quantity of fines evacuated over a period of time drops below a predetermined threshold. In another alternative embodiment, the method and system may include operating the chamber for a given period of time, such as at least 10 minutes or at least 15 minutes. The chamber may be rotated at a constant speed, or the speed of rotation may be varied during the tumbling process as desired. Similarly, in the embodiment of the system illustrated in FIG. 5, the shake table may be operated to vibrate the screen at a constant frequency and amplitude or with varying frequencies and amplitudes as desired. The residence time and operating parameters may be varied to provide useful and economic results with the particular embodiment of the method and system.

Referring generally to FIGS. 6 through 9, another embodiment of a system for making processed DRI is illustrated for processing DRI material in a substantially continuous operation. A method and system for making DRI may comprise assembling a rotatable chamber having a feed end and an exit end, and having an internal screen capable of supporting DRI during tumbling as the DRI moves through the rotating chamber from the feed end to the exit end and having at least one opening along the chamber to permit fines removed from the DRI during tumbling to exit the chamber. The method also comprises delivering DRI to the rotatable chamber through the feed end and rotating the chamber to tumble the DRI on the screen in the chamber while the DRI moves through the chamber from the feed end to the exit end while removing fines from the DRI, and removing processed DRI from the exit end of the rotatable chamber.

Figure 6:
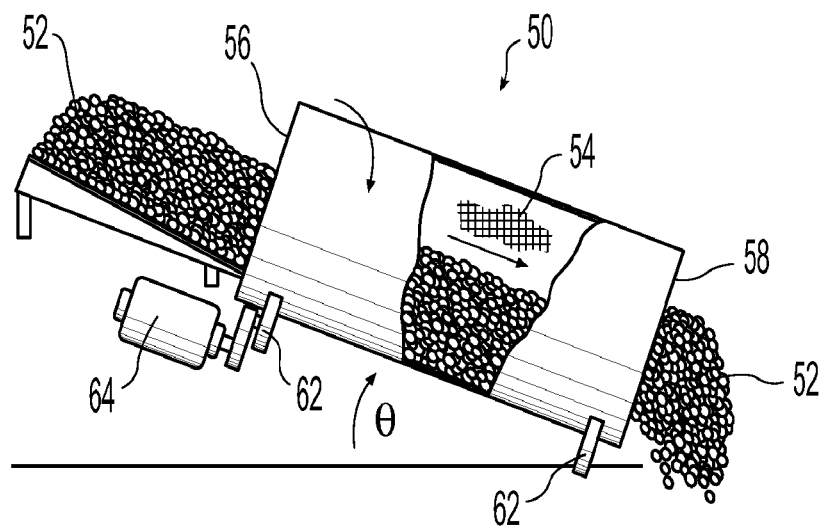
FIG. 6 is a perspective view of yet another embodiment of a system for making processed DRI.

Referring to FIG. 6, chamber 50 is illustrated having a feed end 56 and an exit or discharge end 58. The chamber 50 is substantially cylindrical and may be supported on one or more rollers 62 positioned along the length of the chamber 50. The chamber 50 may be rotated by a motor 64, and in one embodiment, the motor 64 operates in connection with one of the rollers 62. The chamber 50 has a screen 54 relieved across the inner surface of the chamber. As previously described the screen 54 is adapted to support DRI pellets 52 as the chamber 50 is rotated. The DRI pellets 52 are supplied to the chamber 50 at the feed end 56. The DRI pellets 52 may be supplied by a conveyor, tray or other device suitable for transferring the DRI pellets 52 into the feed end 56 of the chamber 50.

The DRI pellets 52 entering the chamber are tumbled on the screen 54 as the chamber 50 rotates. As the chamber 50 rotates the DRI pellets 52 move along the length of the chamber 50 on the screen 54 from the feed end 56 to the discharge end 58. As shown in FIG. 6, the chamber 50 may be positioned on an incline such that gravity urges the DRI pellets 52 from the feed end 56 to the discharge end 58 as the chamber rotates. The length of the chamber 50 and the angle θ may be selected to achieved a desired flow rate of DRI pellets 52 through the chamber 50, given a desired residence time and rotation rate of the chamber 50.

Referring now to FIGS. 7A and 7B, in another embodiment of the system and method for making processed DRI, the chamber 50 may comprise ridges or flites 55 adapted to urge the DRI pellets 50 along the length of the chamber 50 to the discharge end 58. As illustrated, the flites 55 may form a spiral pattern along the length of the inner wall of the chamber 50 such that as the chamber 50 rotates the DRI pellets are urged toward the discharge end. The screen 54 relieved across the inner surface of the chamber may extend between the flites 55. The screen 54 may also be relieved across the flites 55. The flites 55 may be attached to the wall of the chamber 50 as illustrated in FIG. 7A. In one embodiment, the chamber 50 may be approximately eight (8) feet in diameter and have a length of approximately fifty (50) feet. The flites 55 may be welded to the inner wall of the chamber 50 and the system may be capable of processing at least 250 tons of DRI material per hour. In another embodiment, the system may be capable of processing at least 350 tons of DRI material per hour.

In another alternative embodiment, the flites 55 may be attached to a shaft 57 disposed within the chamber 50 as illustrated in FIG. 7B. As shown in FIG. 7B, the chamber 50 and the shaft 57 may be rotated independently from each other. In another alternative embodiment, the ridges or flites may be configured to delay or impede the flow of DRI pellets 52. Delaying or impeding the flow of DRI pellets 52 may increase the residence time of the DRI pellets 52 in the chamber 50. In this manner, the residence time may be increased without lengthening the chamber 50.

Figure 8:
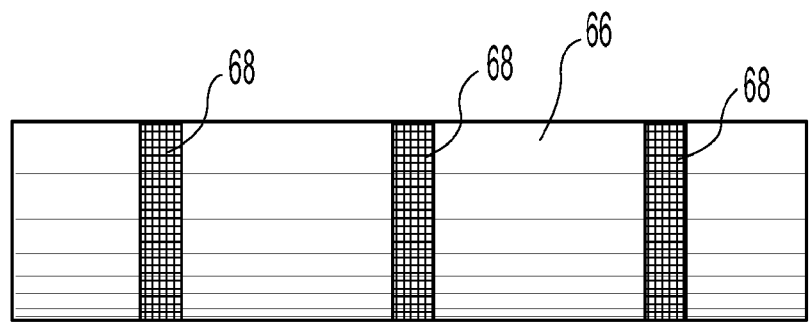
FIG. 8 is a bottom view of a chamber for use with the system of FIG. 6.

The chamber 50 may have a chamber wall 66. The chamber wall 66 may have a plurality of openings 68 as shown in FIG. 8 spaced along the length of the chamber 50 to permit fines removed from the DRI during tumbling to exit the chamber. The openings 68 in the chamber may extend fully or partially along the length of the chamber, or around the circumference of the chamber. As illustrated in FIG. 8, the openings 68 extend partially around the circumference at several locations along the length of the chamber 50. The chamber may be configured such that dust and other particulates may pass through the screen and collect on the inner surface of the chamber wall 66 prior to passing through the openings 68 to exit the chamber. As discussed above, a positive pressure or other collection system may draw the dust and particulates out of the chamber through the openings 68 and may collect the particulates for further processing, such as hot briquetting.

Figure 9:
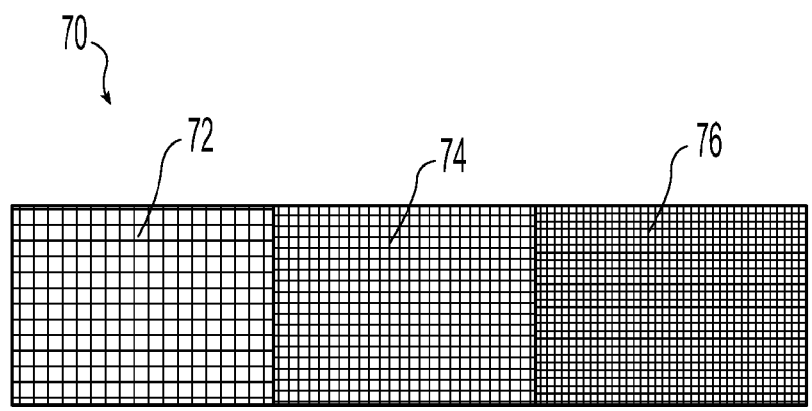
FIG. 9 is a cross sectional view of a screen for use with the system of FIG. 6.

The screen 54 disposed within the chamber 50 may be ¼ mesh, or may be other sizes as desired. The screen may also comprise one or more mesh sizes. A cross sectional view of a screen 70 is illustrated in FIG. 9. As shown in FIG. 9, the screen 70 comprises three discrete portions of different screen size, where the first portion 72 is a ¼ mesh screen, the second portion is a 3/16 mesh screen, and the third portion is a ⅛ mesh screen. The screen 70 may be positioned in a chamber, such as the chamber 50 illustrated in FIG. 6, such that the mesh size of the screen decreases along the length of the chamber from the feed end to the discharge end. As will be apparent, the screen may have one or more discrete portions or may have a variable mesh size along the length of the screen as desired. By changing the mesh size along the length of the chamber, the effective abrasion of the surface of the DRI pellets may be modified and controlled. For example, near the feed end, the DRI material may include weak pellets or pellets having an insufficient compressive strength. As the DRI material begins tumbling on the screen, these weak pellets may be broken down. Near the feed end the screen may be larger, such as ¼ mesh, to accommodate these broken pellets. As the DRI material progresses through the chamber 50, the number of weak pellets may be effectively reduced. One or more screens having a smaller mesh size may be effective at abrading the surface of the remaining DRI pellets to a desired degree of smoothness. The smaller mesh sizes may provide more opportunities for the DRI pellets to contact the screen and abrade the surface of the DRI pellets. As the DRI pellets near the discharge end, the smaller mesh sizes may allow for finer modification of the pellets to remove the remaining dust and other particulates prior to discharge of the pellets. As will be apparent, the profile of the screen may also be changed along the length of the chamber 50 to improve the effectiveness of the processing of the DRI pellets as the pellets move through the chamber from the feed end to the discharge end.

In the method and system of making processed DRI material, a non-oxidizing atmosphere may be provided but is not necessary. To reduce oxidation of DRI pellets, an atmosphere substantially depleted of oxygen may be provided within the chamber while the DRI is being processed.

The method and system for making DRI may also comprise applying oil to the processed DRI after processing to remove dust and other particulates. The oil may be applied by spray nozzles positioned above rollers shown in FIG. 10 adapted to deliver oil to the processed DRI which is rotated by the rollers. In one embodiment, the oil being applied to the processed DRI is heated to reduce the viscosity of the oil and increase penetration of the oil into the pores of the DRI nodules and improve the coating effectiveness of the DRI material. The method and system of making DRI may also comprise assembling rollers downstream of the chamber adapted to rotate processed DRI removed from the chamber by rotation of said rollers, and positioning spray nozzles over the rollers adapted to deliver oil to the processed DRI while rotating on the rollers.

Figure 10:
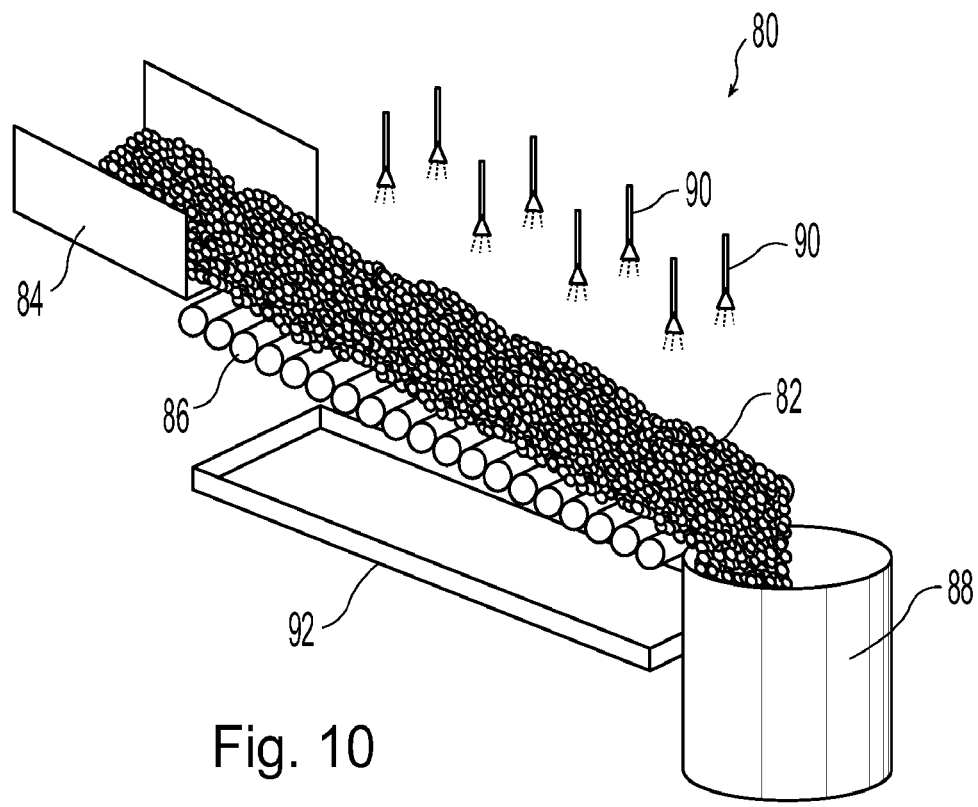
FIG. 10 is an embodiment of a system for coating processed DRI.
Figure 11:
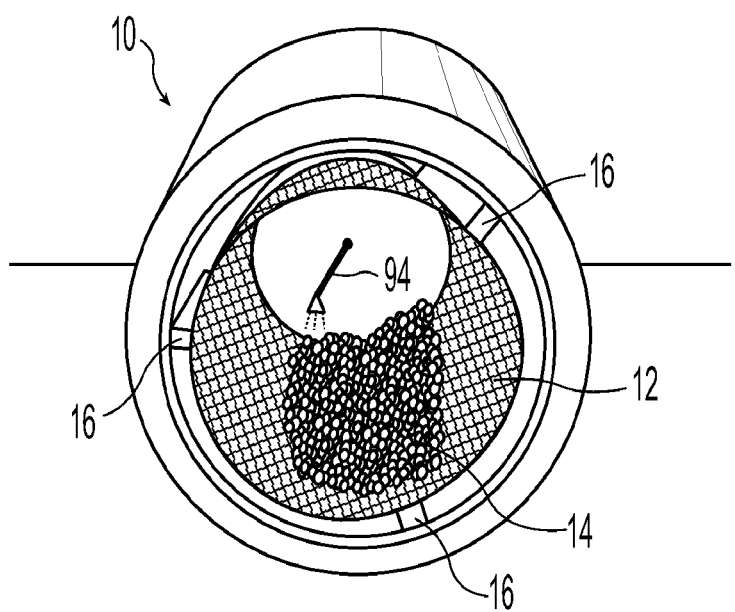
FIG. 11 is another embodiment of a system for coating processed DRI.

Referring now to FIGS. 10 and 11, embodiments of the method and system of applying oil to DRI material are illustrated. A roller system 80 may be adapted to rotate the DRI pellets or nodules and facilitate effective application of oil to DRI material 82. The roller system 80 may include a feed tray 84 supplying DRI material 82 to a plurality of rollers 86 upon which the DRI material may be supported. The DRI material 82 may be rotated or rolled over the rollers 86 to a collection bin 88. In an alternative embodiment, the DRI material may be provided to a conveyor, tray or other suitable device for transporting the DRI to a subsequent processing or storage location to spray the DRI as it is rotated by the rollers. As illustrated in FIG. 10, one or more spray nozzles 90 may be positioned above the rollers 86. The spray nozzles 90 may be adapted to deliver oil to the processed DRI rotating on the rollers. An oil and fines recovery tray 92 may be positioned below the rollers 86 to capture any fines or oil passing between the rollers 86. The oil and fines may be collected and the fines filtered so the oil may be reused. The fines may be combined with the fines collected during the tumbling process and used for subsequent processes such as hot briquetting. The collected oil may be filtered as necessary and recycled for reuse to improve the efficiency of the coating system.

The oil applied to the DRI pellets may be selected to passivate the DRI material. The oil may substantially coat the DRI material reducing exposure of the DRI to oxygen and moisture. By reducing exposure to oxygen and moisture, oxidation and the generation of hydrogen gas may be reduced. The oil coating may also operate to retain fugitive dust reducing the potential for combustion of DRI during storage or transportation.

In one embodiment, the oil may be mineral oil. Additionally, the mineral oil may be mixed with oleic acid. Oleic acid may assist in reducing exposure to moisture and thereby reduce oxidation of the DRI pellets. The polar end of the oleic acid molecules may attach to the surface of the DRI pellet while the rest of the linear chain of the oleic acid molecule protrudes away from the DRI pellet surface. This type of surface coating may be hydrophobic and repel moisture away from the pellet surface. Other oils and mixtures may also be applied to passivate the DRI material. In one embodiment, coating DRI material with a mixture of mineral oil and oleic acid reduced the porosity of the DRI material from approximately 57% to approximately 29.1%.

Referring to FIG. 11, another embodiment of the method and system for applying oil to DRI material is illustrated. The chamber 10 shown in FIG. 11 is substantially the same as that illustrated in FIG. 1 with the addition of spray nozzle 94. The spray nozzle 94 may be positioned within the chamber 10 in a position so as not to interfere with the screen 12 or the DRI pellets 14 while the DRI material is tumbling. In this embodiment, the system may initially tumble the DRI pellets as previously discussed and subsequently apply oil to the DRI pellets without removing the pellets from the chamber 10. The system may also tumble the DRI pellets in the chamber while oil is being applied. Tumbling the DRI pellets may improve the coverage of the oil on the surface of the DRI material. The chamber 10 may also be adapted to collect and recycle any excess oil to improve the efficiency of the coating operation.

The method and system for making DRI may also comprise applying a material adapted to increase the compressive strength of the DRI to the processed and oiled DRI. The applied material may be an organic or inorganic binder. Applying a coating material, such as a binder, to increase the compressive strength of the DRI material may reduce breakage of the DRI pellets during transportation. In one example, a limestone binder may be used. Limestone is often used in steelmaking operations. By using a limestone binder with the DRI material, the compressive strength of the DRI may be improved for transportation and the need to add additional limestone during the steelmaking operation may be reduced.

Figure 12A:
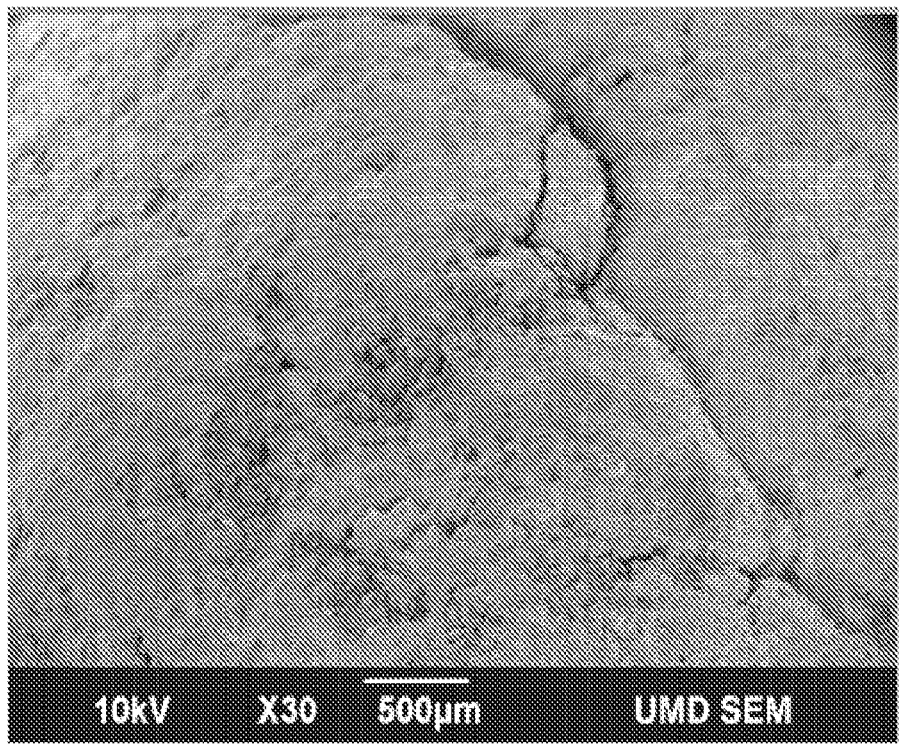
FIGS. 12A-12B are micrographs of the surface of DRI pellets before processing.
Figure 12B:
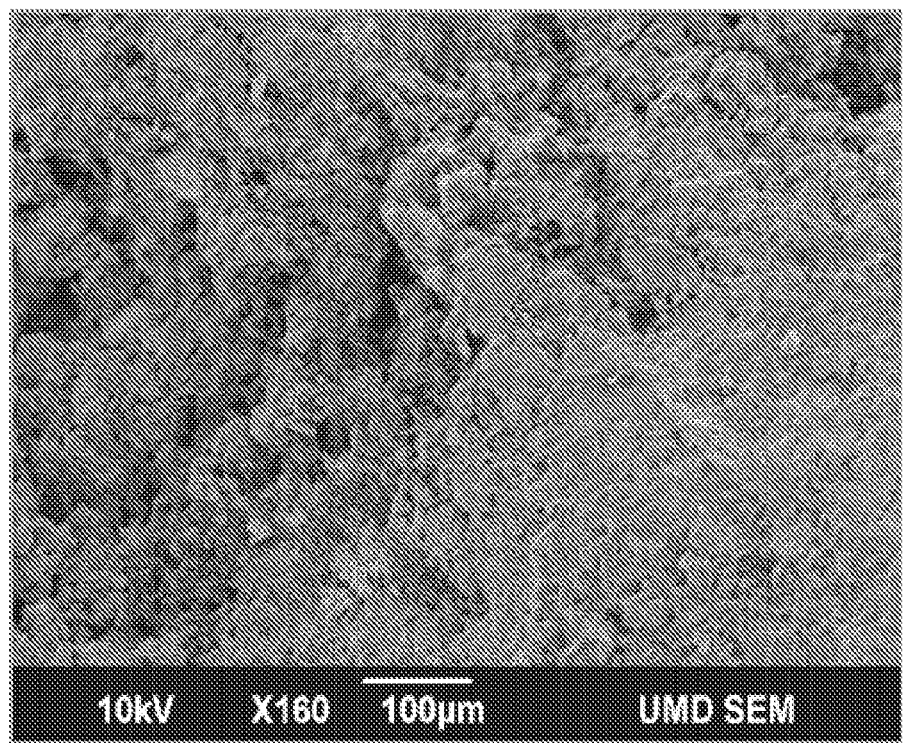
Figure 13A:
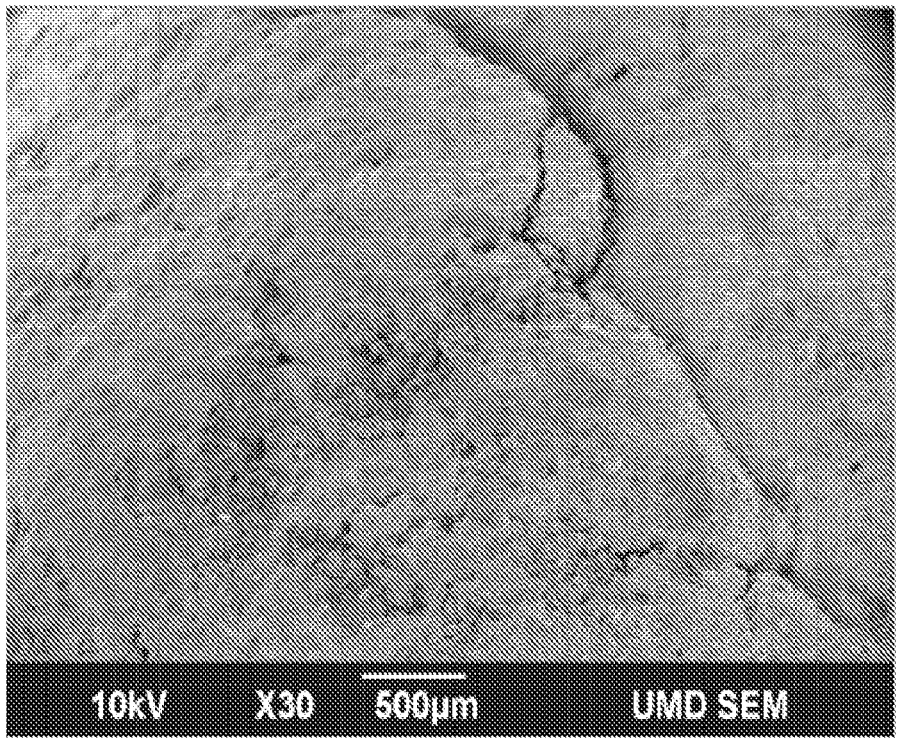
FIGS. 13A-13B are micrographs of the surface of DRI pellets after processing.
Figure 13B:
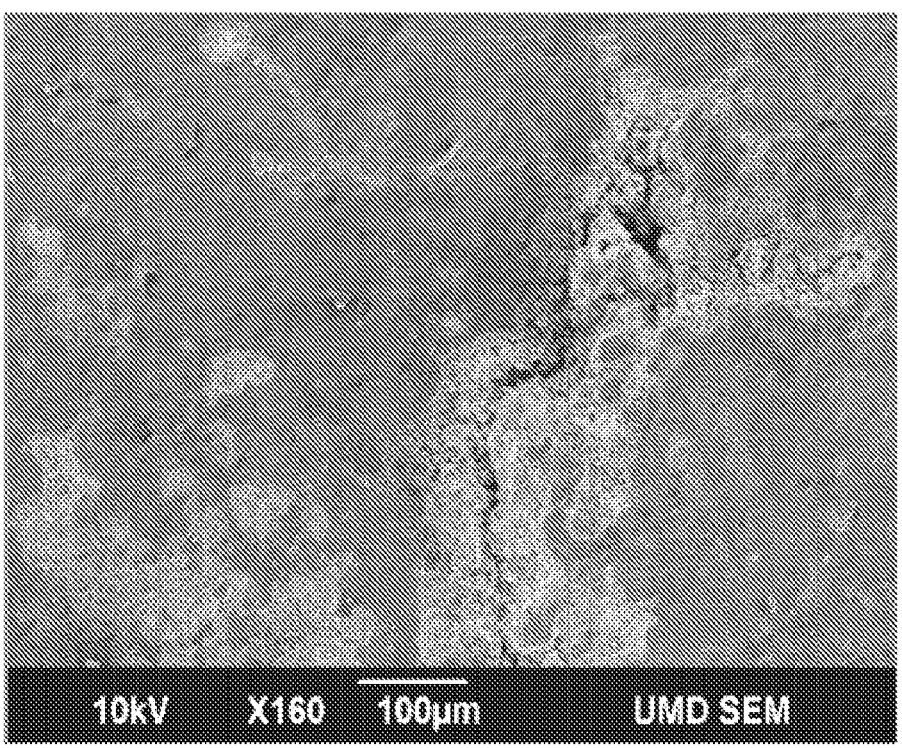

Referring now to FIGS. 12 and 13, micrographs of the surface of DRI pellets are shown. The surface of DRI pellets prior to processing are shown in FIGS. 11A and 11B at magnification of 30× and 160×. The surface of DRI pellets after processing in accordance with the present disclosure are shown in FIGS. 12A and 12B also at 30× and 160× magnification. As will be apparent from a comparison of the micrographs, the surface of the processed DRI pellets is substantially more uniform than the surface of the unprocessed DRI pellets. As seen in these micrographs, the surface of a DRI pellet as originally formed may be substantially rough or uneven. During storage and transportation the rough surface may be eroded as the DRI pellets contact each other and the surfaces of the storage or transportation equipment causing dust, particulates, and other fines to be generated. The system and method for making processed DRI previously described may abrade the rough surface of the DRI pellets to remove the dust, particulates, and other fines. As a result, during storage and transportation, the processed DRI pellets made in accordance with the present disclosure may produce substantially fewer fines and have a reduced risk of combustion.

Figure 14:
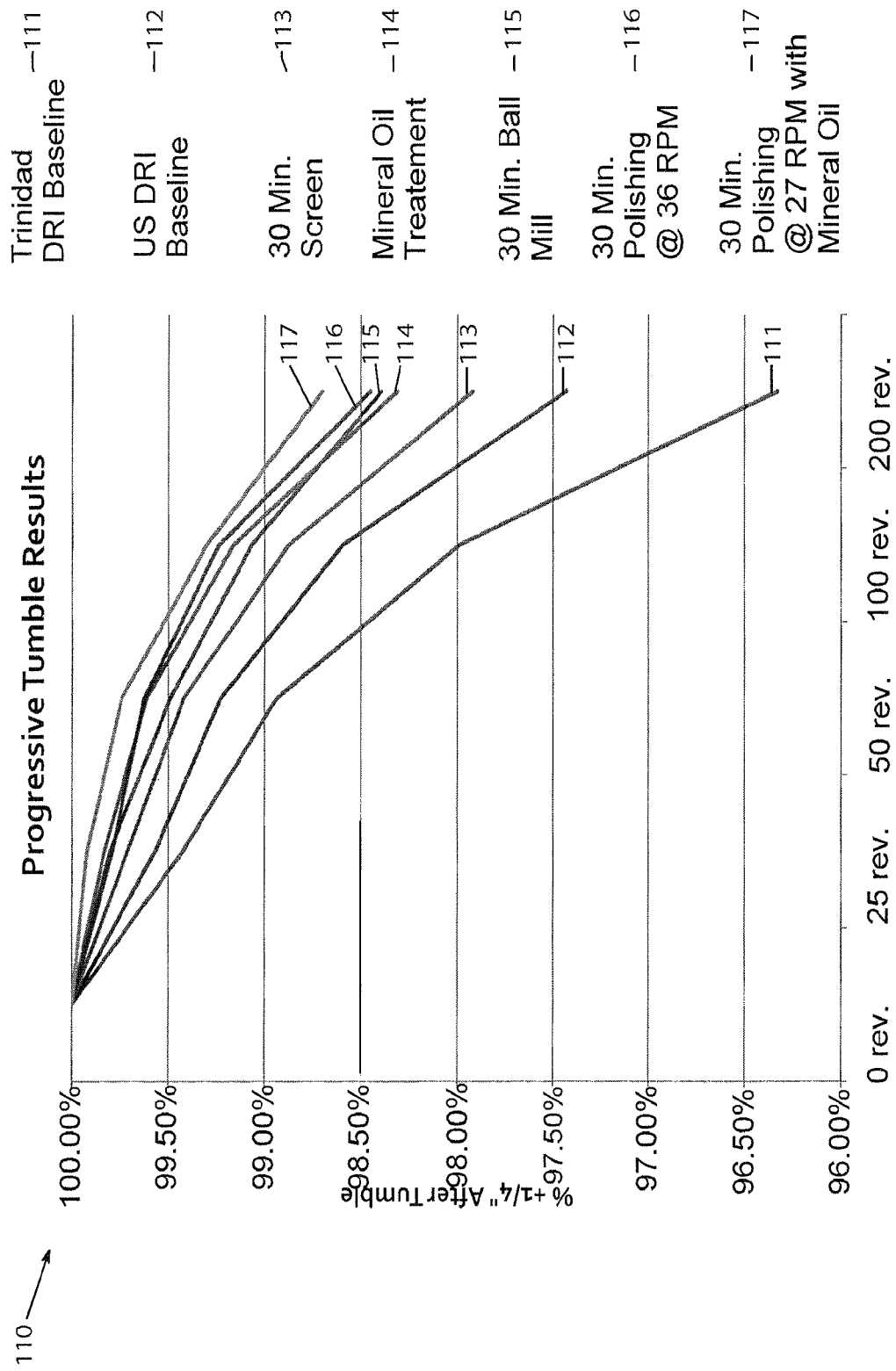
FIG. 14 is a graph of comparative tumble results for material greater than ¼ mesh.
Figure 15:
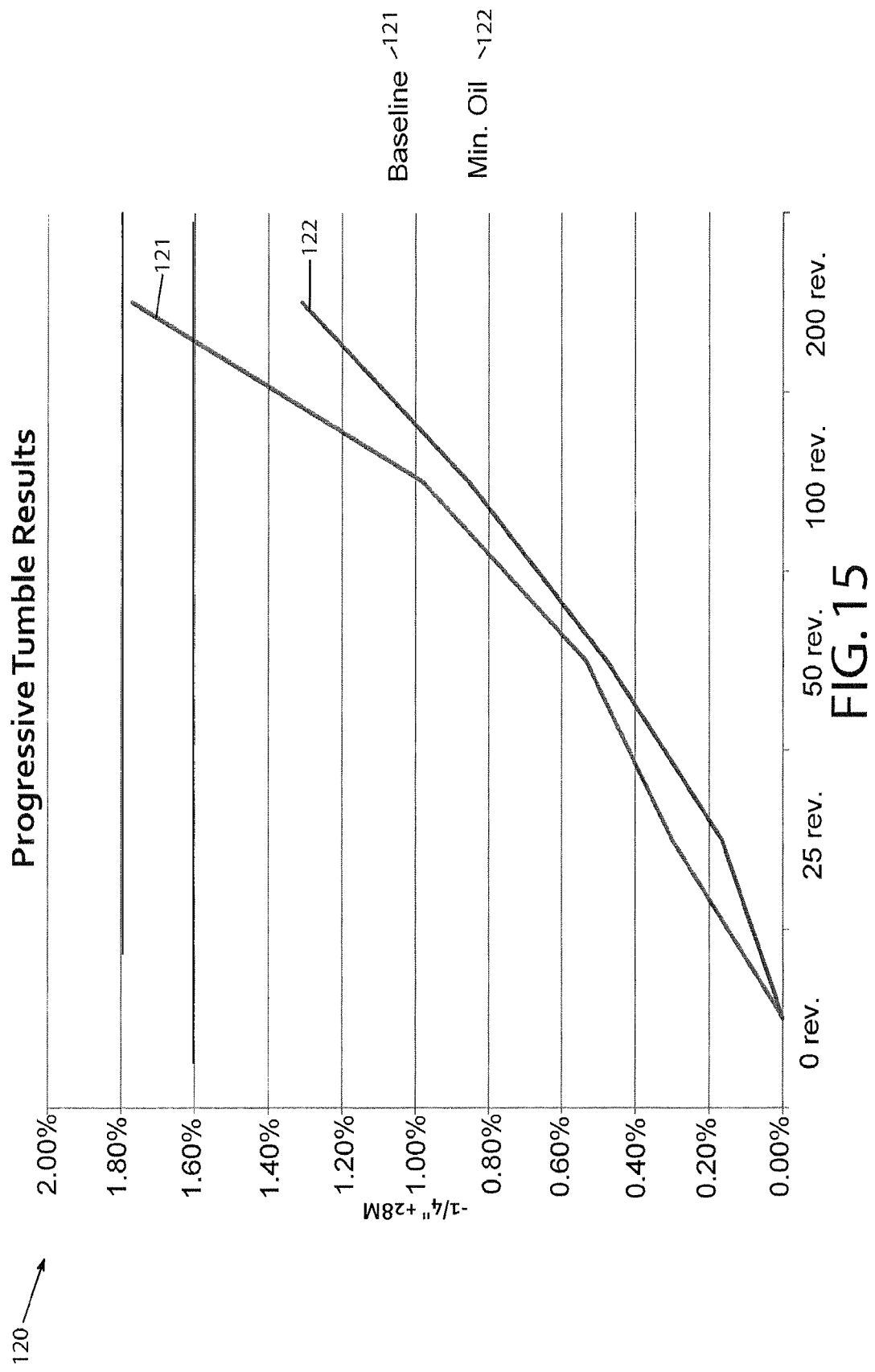
FIG. 15 is a graph of comparative results for fines in the range −¼"+28 M.
Figure 16:
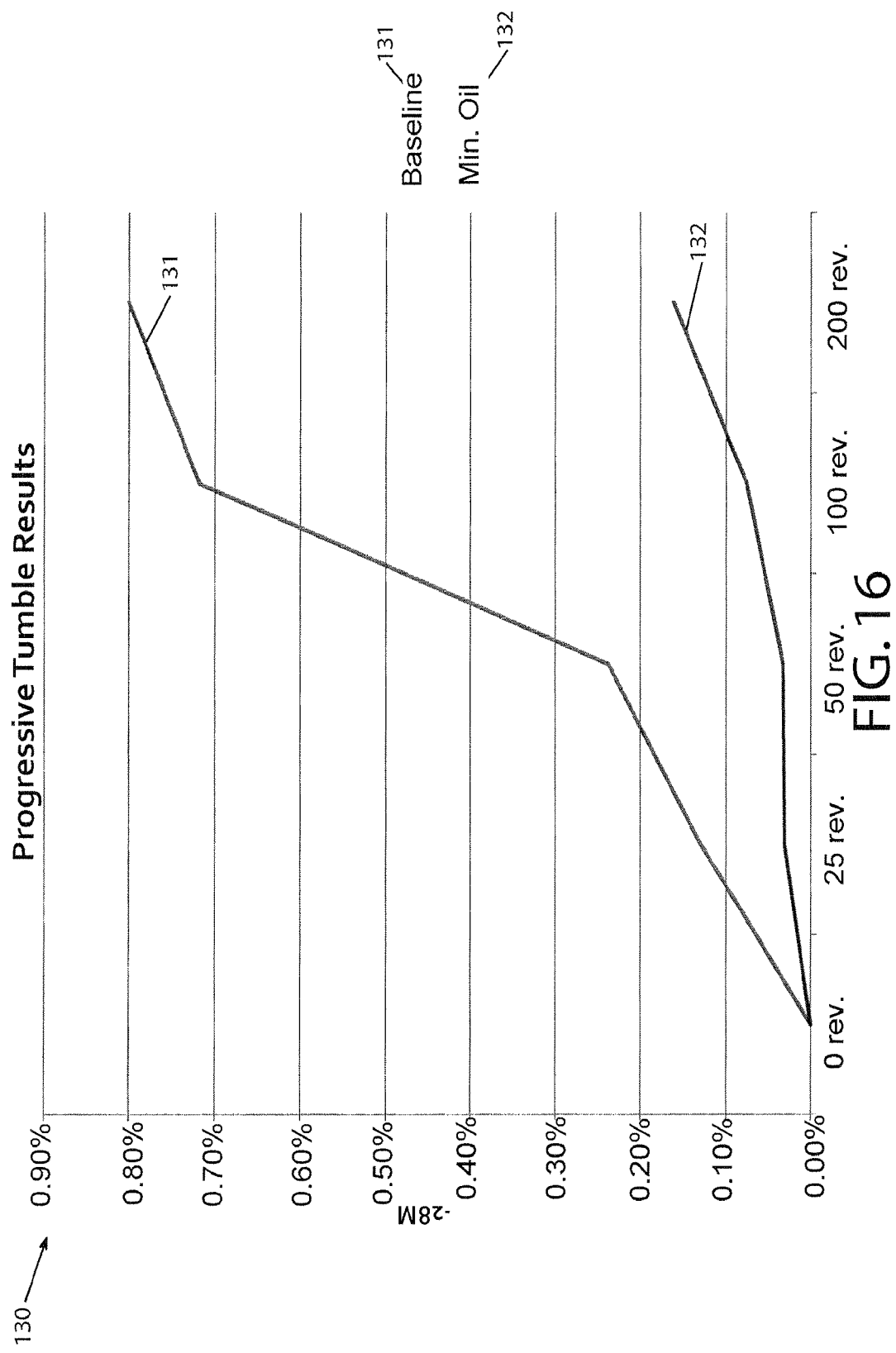
FIG. 16 is a graph of comparative results for fines less than 28 M.

Referring now to FIGS. 14 through 16, the generation of dust, particulates, and other fines for various samples of DRI pellets are illustrated. The amount of dust, particulates, and other fines from a given sample of DRI may be measured by tumbling the DRI in a drum such as illustrated in FIG. 1, described above. Fines may be sorted or classified according to particulate size. For illustration purposes only, "particulates" may be those fines that pass through a ¼ mesh screen and classified to that retained by a 28 mesh screen, and measured as percent by weight of the total material screened (%–¼"+28 M). "Dust" may be those fines that pass through a 28 mesh screen, and may be measured as percent by weight of the total material screened (%–28 M). The DRI material that does not constitute dust, particulates, or other fines, the material that is retained on a ¼ mesh screen may be measured as a percent by weight of the total material screened (%+¼"). As will be apparent, any screen sizes may be selected, and the sizes described here are for illustration purposes only.

A graph 110 of progressive tumble results is depicted in FIG. 14. The graph 110 illustrates the percent of DRI material retained on a ¼ mesh screen after a selected number of revolutions in a tumble drum, such as may be used to determine an ISO Tumble Index. As illustrated, as the number of revolutions increase, the percent of DRI material retained on the ¼ mesh screen is reduced, indicating the generation of dust, particulates, and other fines. Untreated DRI from Trinidad 111 and from the United States 112 was measured to determine a relative baseline for the amount of fines generated by the tumble test. The generation of fines was found to be reduced after the DRI material was treated for thirty (30) minutes on the Gilson screen illustrated in FIG. 5 as shown by line 113. Similarly, treating DRI material with mineral oil 114 also produced fewer fines than the baseline samples. A thirty (30) minute treatment in a ball mill 115 was found to be less effective at reducing fine generation than the mineral oil 114. The results of DRI treated in accordance with the present disclosure are illustrated in line 116 and line 117. Line 116 shows an improvement in the amount of DRI material retained on a ¼ mesh screen to approximately 98.5% for DRI material tumbled for thirty (30) minutes at 36 RPM. Similarly, line 117 shows an improvement in the amount of DRI material retained on a ¼ mesh screen to approximately 98.7% for DRI material tumbled for thirty (30) minutes at 27 RPM and treated with mineral oil as previously described. As illustrated, the methods presently disclosed may reduce the amount of fines generated by removing dust, particulates, and other fines from the DRI material by tumbling the DRI material over a screen.

To further illustrate the reduction in fines achieved, FIG. 15 illustrates a comparison of the particulates, fines that pass through a ¼ mesh screen but are retained by a 28 mesh screen, generated from a sample of untreated DRI material 121 and a sample of DRI material 122 treated with mineral oil. As shown, the amount of particulates generated after 200 revolutions in a tumble drum is reduced from approximately 1.8% to approximately 1.3%.

FIG. 16 illustrates a comparison of the dust, fines that pass through a 28 mesh screen, generated from a sample of untreated DRI material 131 and a sample of DRI material 132 treated with mineral oil. As shown, the amount of dust generated after 200 revolutions in a tumble drum is reduced from approximately 0.8% to approximately 0.15%.

Figure 17:
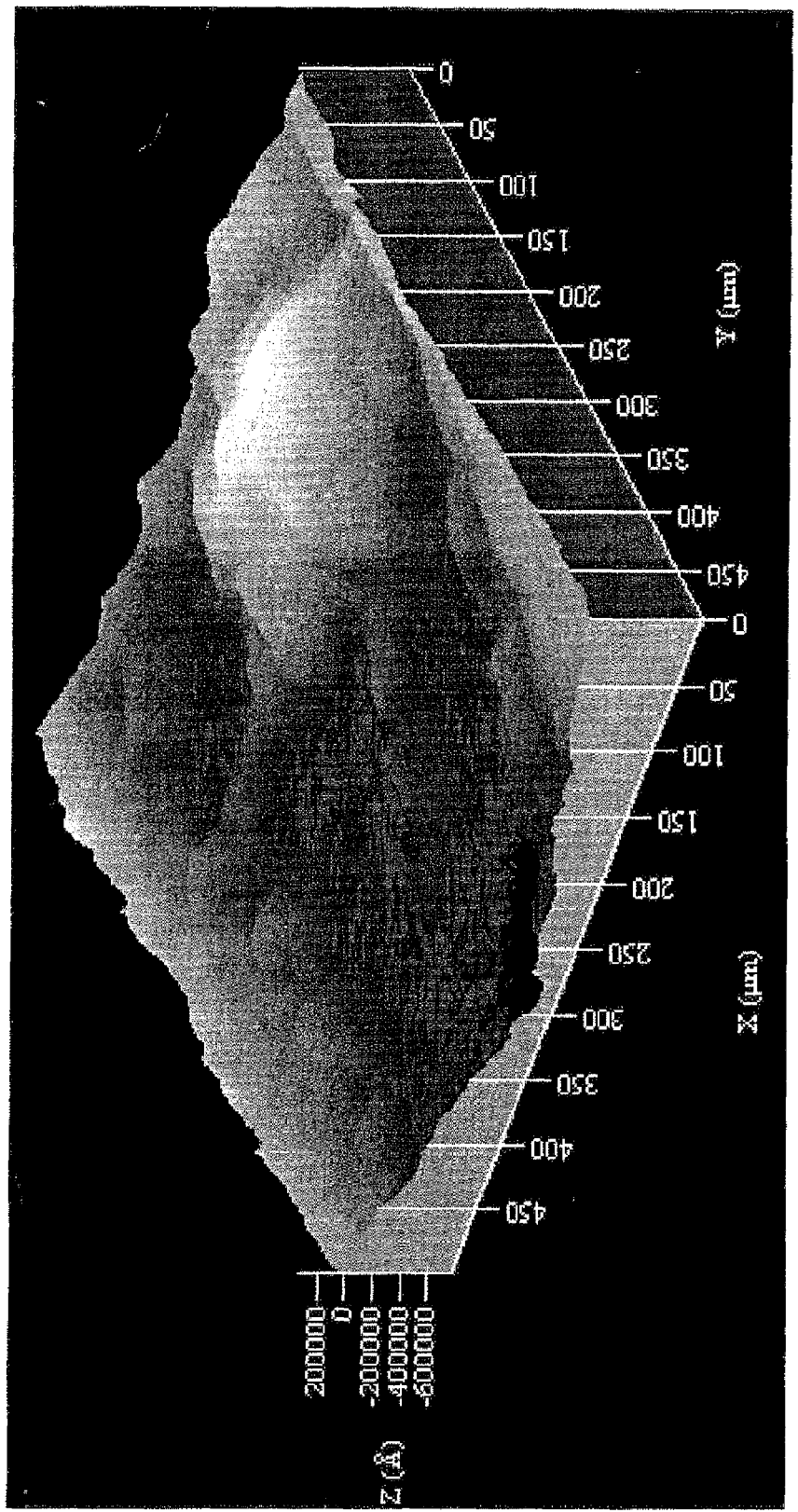
FIG. 17 is a surface profile of a DRI pellet before processing.
Figure 18:
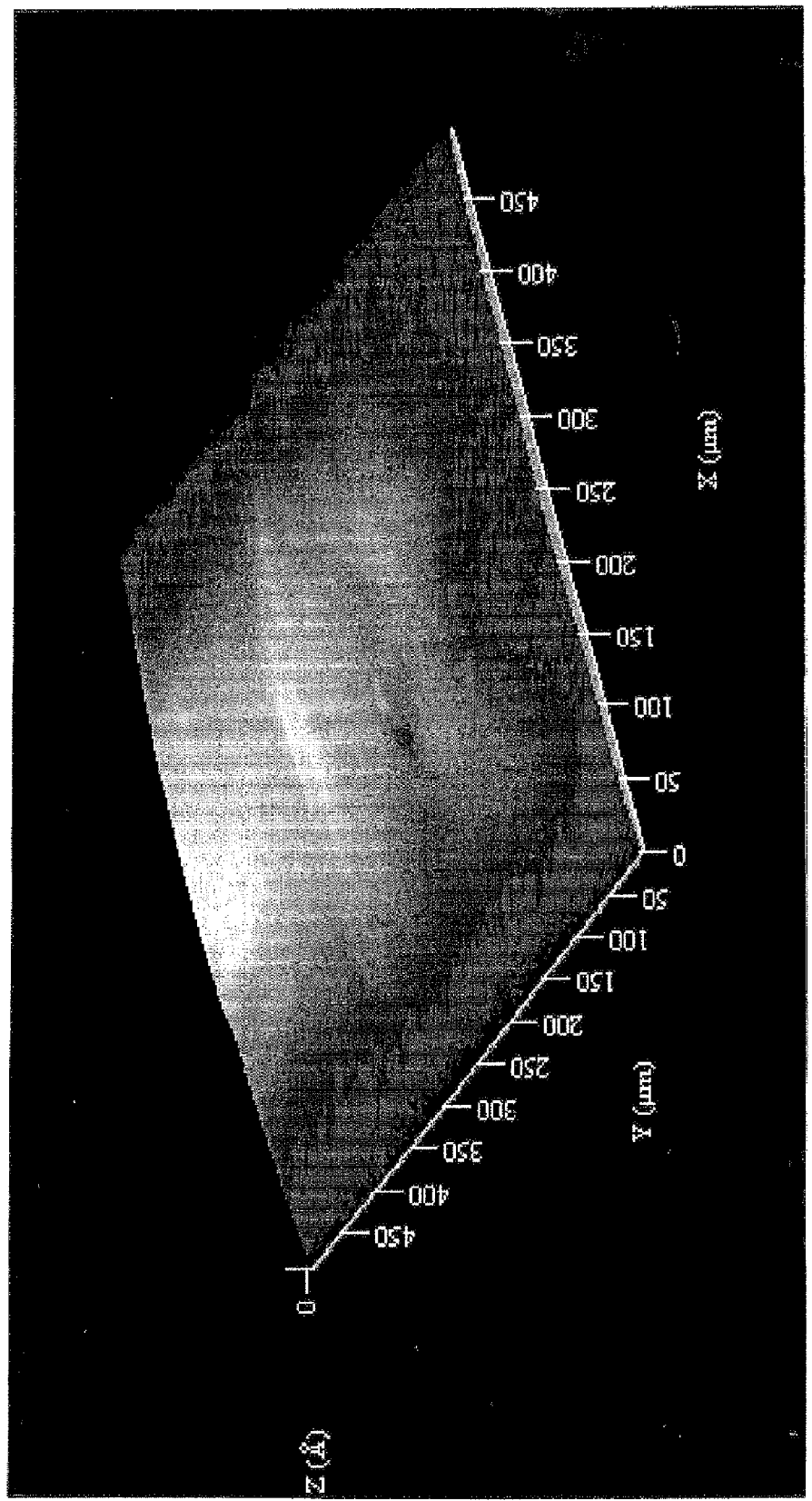
FIG. 18 is a surface profile of a DRI pellet after processing.

Referring now to FIGS. 17 through 19, a DRI material having a reduced surface roughness is disclosed. The surface roughness of DRI material, such as DRI pellets, may be measured by a stylus profilometer, such as the Tencor P10 Profilometer, or other surface profiling equipment and may be quantified by an arithmetic mean surface roughness or "Ra" value. DRI material having reduced surface roughness may be produced using the method and system previously discussed to produce the DRI material having an average surface roughness (Ra) of less than 1.5 μm. In other embodiments, the DRI material may have an average surface roughness (Ra) of less than 1.0 μm, or less than 0.75 μm. By reducing the roughness of the surface of the DRI material, it has been shown that the subsequent production of fines is greatly reduced during transportation or later processing of the DRI material. The reduction in the generation of fines reduces the pyrophoric properties of the DRI material providing for a more stable and safer product.

In one experiment, the average surface roughness (Ra) was measured for a sample of unprocessed DRI pellets and for a sample of DRI pellets after processing in accordance with the present disclosure. As illustrated in the following table, the surface roughness, Ra values in μm, of the unprocessed DRI pellets is substantially greater than the surface roughness of the processed DRI pellets.

| Processed DRI Material (Ra μm) | Unprocessed DRI Material (Ra μm) |
| --- | --- |
| 0.43732 | 1.8738 |
| 0.81799 | 2.3311 |
| 0.49770 | 4.9721 |
| 0.52375 | 1.8811 |
| 0.69036 | 3.4270 |
| 0.45881 | 2.4267 |
| 0.52639 | 3.8346 |
| 0.49089 | 2.2437 |

The reduced surface roughness may be further illustrated by reference to FIG. 17 and FIG. 18. The surface of an unprocessed DRI pellet was profiled using a Tencor P10 Profilometer and the measured surface profile is plotted in FIG. 17. As shown, the unprocessed DRI pellet has a highly irregular surface. In this illustration, the Z-axis reflects a range of −60 μm to +20 μm and the pellet surface is shown having substantial variation in this range. In contrast, FIG. 18 is a comparable image for a DRI pellet processed according to the present disclosure. As illustrated, the surface irregularity has been substantially reduced. The Z-axis scale for FIG. 18 was too small to be displayed by the graphing software utilized further indicating the substantial reduction in surface roughness achieved.

Figure 19A:
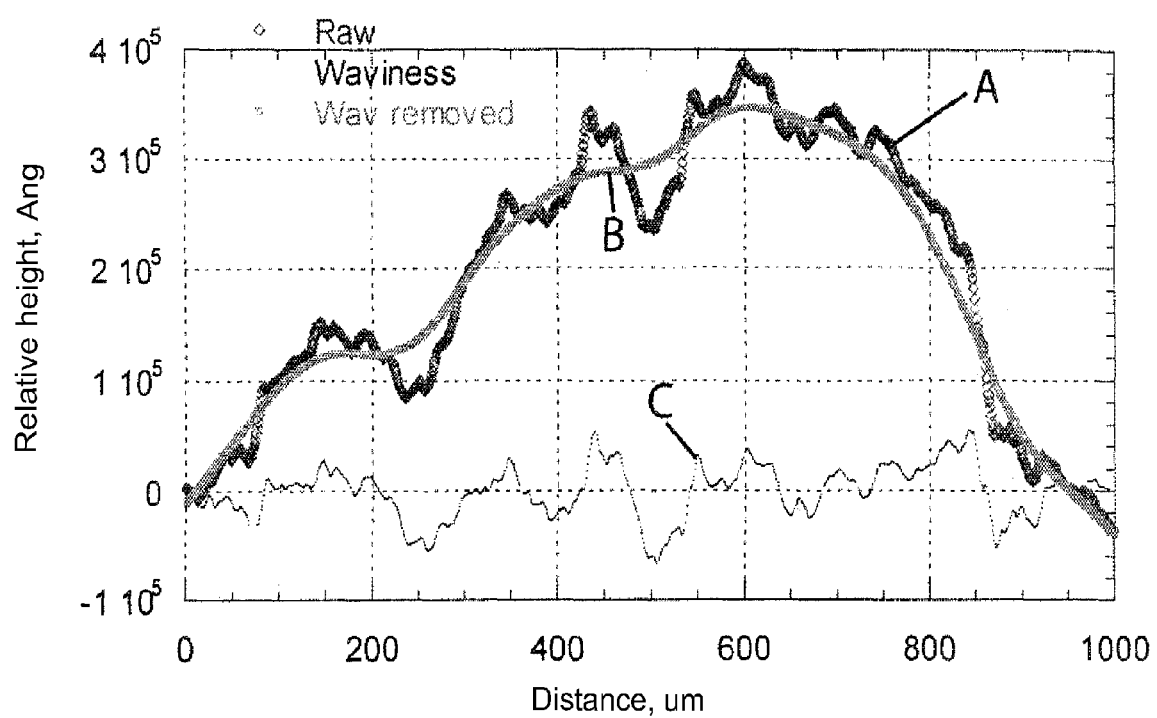
FIGS. 19A-C are graphs illustrating surface characteristics of DRI pellets.
Figure 19B:
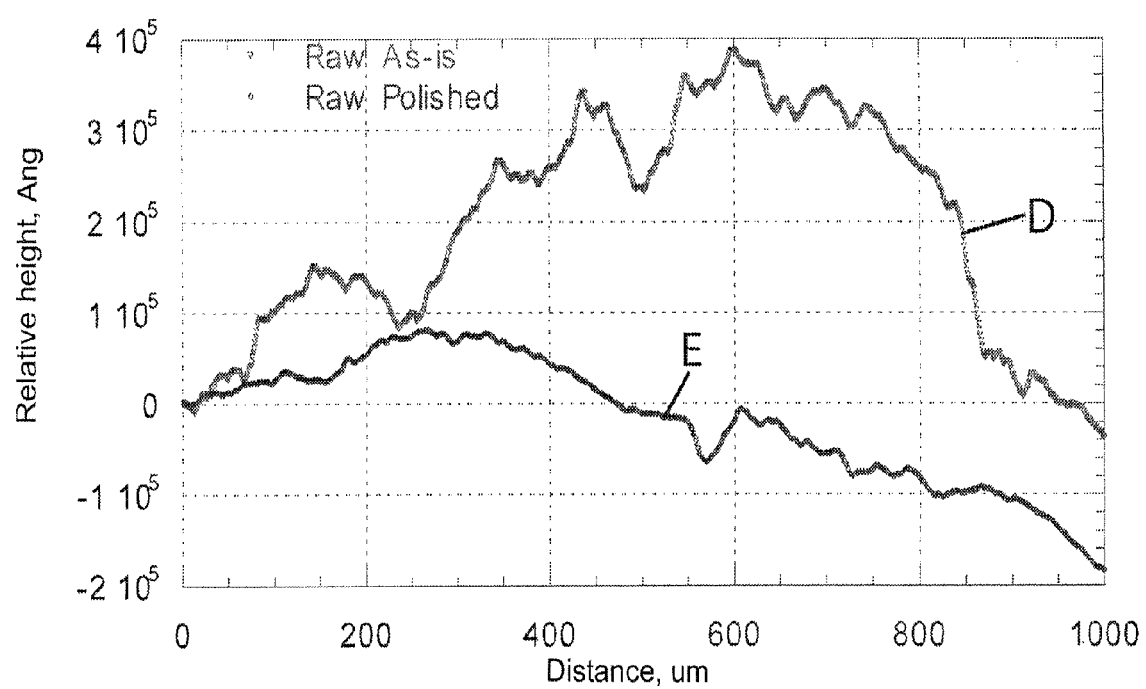
Figure 19C:
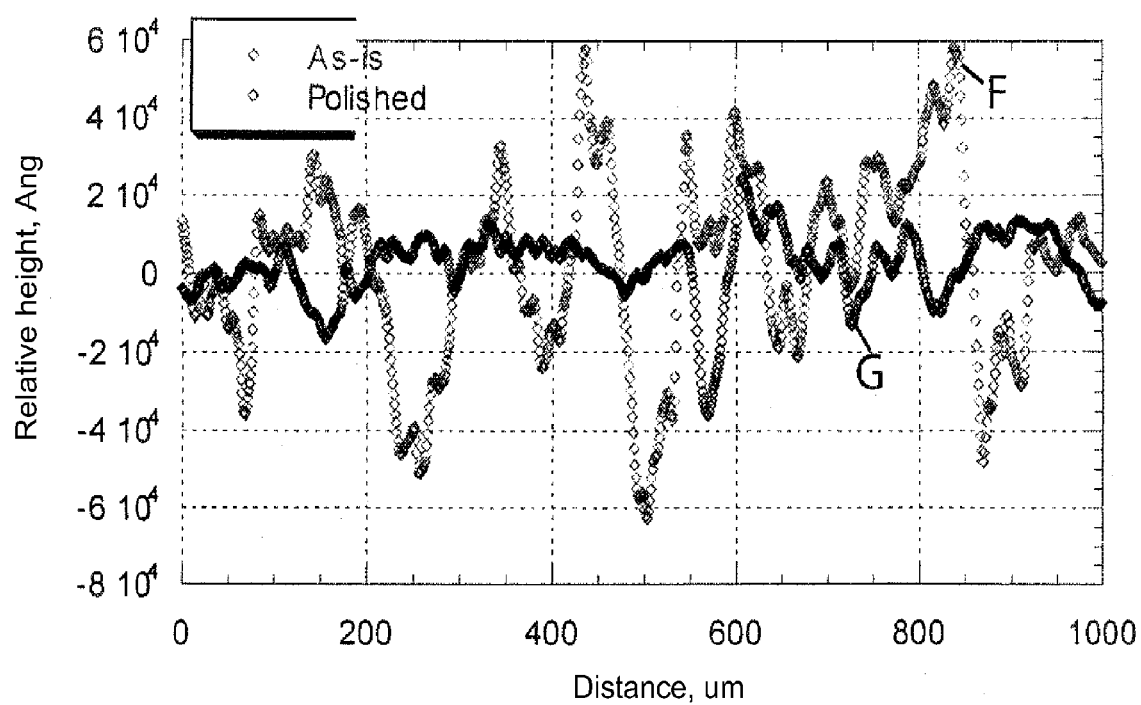

As noted above, the surface roughness of DRI material, such as a pellet, may be measured by a stylus profilometer or other profiling equipment. Using such equipment, it may be necessary to compensate for the curvature of DRI pellets to obtain an accurate measurement of the surface roughness. Various techniques are known in the art for obtaining surface roughness measurements for round or irregularly shaped objects. In one example, the surface roughness measurement may be performed on a substantially flat portion of a pellet. Alternatively, as described with reference to FIGS. 19A-C, the roughness calculation may be performed while compensating for irregularity in the shape of a pellet. In FIG. 19A, line A represents the raw measurement of an unprocessed DRI pellet; line B represents the computed irregularity of the pellet; and line C represents the adjusted measurement for the unprocessed pellet after compensating for the computed irregularity. In FIG. 19B, line D represents the raw measurement of the unprocessed DRI pellet; and line E represents the raw measurement of a processed DRI pellet of the present disclosure. Finally, in FIG. 19C, line F represents the adjusted measurement of the unprocessed DRI pellet; and line G represents the adjusted measurement of the processed DRI pellet, each having been modified to compensate for the general shape of the DRI pellet being tested. As is apparent from FIG. 19C, the processed DRI pellet has substantially less surface roughness than the unprocessed pellet. Other measurement techniques and processing tools known in the art may also be utilized to obtain the average surface roughness (Ra) value for a DRI pellet.

As will be apparent from the foregoing discussion, the processed DRI material may have an average surface roughness (Ra) of less than 1.5 μm. In alternative embodiments, the processed DRI material may have an average surface roughness (Ra) of less than 1.0 μm, or less than 0.75 μm. The processed DRI material may comprise pellets, and may have a tumble index of greater than 98.5%+¼ after 200 revolutions. In other embodiments, the processed DRI material may be coated with oil, and the oil may comprise mineral oil and oleic acid. Treating the DRI material with oil may reduce oxidation by protecting the DRI material from exposure to water during transport. The processed DRI material may also comprise a binder, such as limestone, to increase the compressive strength of the DRI material.

The processed DRI material described above having an average surface roughness (Ra) of less than 1.5 μm may be made by the steps of assembling a rotatable chamber having a feed end and an exit end, and having an internal screen capable of supporting DRI during tumbling as the DRI moves through the rotating chamber from the feed end to the exit end and having at last one opening along the chamber to permit fines removed from the DRI during tumbling to exit the chamber, delivering DRI to the rotatable chamber through the feed end and rotating the chamber to tumble the DRI on the screen in the chamber while the DRI moves through the chamber from the feed While certain embodiments have been described, it will be understood that various changes may be made, equivalents may be substituted, and modifications may be made to adapt a particular situation or material to the teachings of the disclosure without departing from the sprit or scope of the present disclosure.

What is claimed is:

1. A method of making processed DRI comprising the steps of:
   a. assembling a rotatable chamber having an internal screen having a mesh size between ⅛ and ¼ mesh capable of supporting DRI during tumbling within the chamber, with at least one opening in the chamber adapted to permit fines to exit the chamber during tumbling, and
   b. delivering DRI into the rotatable chamber and rotating the chamber to tumble the DRI on the screen in the chamber to remove fines from the DRI, where the DRI is tumbled in the rotatable chamber at between 20 and 40 revolutions per minute for a residence time of at least 10 minutes in the chamber.

2. The method of making processed DRI as claimed in claim 1 further comprising the step of:
   c. evacuating fines removed from the DRI through the at least one opening in the rotatable chamber during rotation of the chamber.

3. The method of making processed DRI as claimed in claim 1 further comprising the steps of:
   c. assembling rotatable rollers downstream of the rotatable chamber adapted to rotate the DRI and applying oil to the processed DRI rotating on the rollers.

4. The method of making processed DRI as claimed in claim 3 further comprising the step of:
   d. positioning spray nozzles above the rollers adapted to deliver oil to the processed DRI rotating on the rollers.

5. The method of making processed DRI as claimed in claim 3 where the oil comprises mineral oil.

6. The method of making processed DRI as claimed in claim 3 where the oil comprises oleic acid.

7. The method of making processed DRI as claimed in claim 3 where the oil is heated prior to delivery to the processed DRI.

8. The method of making processed DRI as claimed in claim 3 further comprising the step of:
   e. applying a material adapted to increase the compressive strength of the DRI to the processed and oiled DRI.

9. The method of making processed DRI as claimed in claim 8 where the material comprises limestone.

10. A method of making processed DRI comprising the steps of:
    a. assembling a rotatable chamber having a feed end and an exit end, and having an internal screen having a mesh size between ⅛ and ¼ mesh capable of supporting DRI during tumbling as the DRI moves through the rotating chamber from the feed end to the exit end and having at last one opening along the chamber to permit fines removed from the DRI during tumbling to exit the chamber,
    b. delivering DRI to the rotatable chamber through the feed end and rotating the chamber to tumble the DRI on the screen in the chamber while the DRI moves through the chamber from the feed end to the exit end while removing fines from the DRI, where the DRI is tumbled in the rotatable chamber at between 20 and 40 revolutions per minute for a residence time of at least 10 minutes in the chamber, and
    c. removing processed DRI from the discharge end of the rotatable chamber.

11. The method of making processed DRI as claimed in claim 10, where the chamber further comprises spiral flites adapted to urge the DRI along the length of the chamber toward the discharge end.

12. The method of making processed DRI as claimed in claim 10 further comprising the step of:
    d. evacuating fines removed from the DRI through the opening in the rotatable chamber during rotation of the chamber.

13. The method of making processed DRI as claimed in claim 10 further comprising the steps of:
    d. assembling rotatable rollers downstream of the rotatable chamber adapted to rotate the DRI and applying oil to the processed DRI rotating on the rollers.

14. The method of making processed DRI as claimed in claim 13 further comprising the step of:
    e. positioning spray nozzles above the rollers adapted to deliver oil to the processed DRI rotating on the rollers.

15. The method of making processed DRI as claimed in claim 13 where the oil comprises mineral oil.

16. The method of making processed DRI as claimed in claim 13 where the oil comprises oleic acid.

17. The method of making processed DRI as claimed in claim 13 where the oil is heated prior to delivery to the processed DRI.

18. The method of making processed DRI as claimed in claim 13 further comprising the step of:
    e. applying a material adapted to increase the compressive strength of the DRI to the processed and oiled DRI.

19. The method of making processed DRI as claimed in claim 18 where the material comprises limestone.

20. A method of making processed DRI comprising the steps of:
    assembling a chamber having an internal screen an internal screen having a mesh size between ⅛ and ¼ mesh capable of supporting DRI during tumbling within the chamber, with bin adapted to receive fines generated during tumbling of the DRI on the screen, and
    delivering DRI into the chamber and operating the chamber to tumble the DRI on the screen in the chamber to abrade the surface of the DRI, where the DRI is tumbled in the rotatable chamber at between 20 and 40 revolutions per minute for a residence time of at least 10 minutes in the chamber.

* * * * *